United States Patent [19]

Kunimatsu et al.

[11] 4,378,375

[45] * Mar. 29, 1983

[54] PROCESS FOR THE PRODUCTION OF VINEGAR WITH HIGH ACETIC ACID CONCENTRATION

[75] Inventors: Yoshio Kunimatsu, Handa; Shoji Ohmori, Aichi; Hiroshi Masai, Handa; Koki Yamada, Handa; Mikio Yamada, Handa, all of Japan

[73] Assignee: Nakano Vinegar Co., Ltd., Japan

[*] Notice: The portion of the term of this patent subsequent to Aug. 4, 1998, has been disclaimed.

[21] Appl. No.: 196,087

[22] Filed: Oct. 10, 1980

[30] Foreign Application Priority Data

Oct. 11, 1979 [JP] Japan .................................. 54-129891

[51] Int. Cl.$^3$ ............................. C12P 7/54; C12J 1/04
[52] U.S. Cl. ....................................... 426/17; 435/140
[58] Field of Search ................... 426/17; 435/140, 818

[56] References Cited

U.S. PATENT DOCUMENTS

| | | | |
|---|---|---|---|
| 3,445,245 | 5/1969 | Ebner | 426/17 |
| 3,779,868 | 12/1973 | Nikolaev et al. | 426/17 |
| 4,076,844 | 2/1978 | Ebner et al. | 426/17 |
| 4,282,257 | 8/1981 | Kunimatsu et al. | 426/17 |

*Primary Examiner*—Raymond N. Jones
*Assistant Examiner*—Elizabeth J. Curtin
*Attorney, Agent, or Firm*—Kane, Dalsimer, Kane, Sullivan and Kurucz

[57] ABSTRACT

Vinegar having an acetic acid concentration higher than 20 percent weight by volume is produced in a submerged fermentation by maintaining the temperature of a fermenting broth at 27°–32° C. until the acetic acid concentration of the fermenting broth (after the initiation of fermentation) reaches 12–15 percent weight by volume. Then the temperature of the fermenting broth is lowered by 0.5° C. to 2° C. Fermentation is continued at the lower temperature until the concentration of acetic acid increases by between 0.05 to 2 percent weight by volume. At this time, the temperature is again reduced by from 0.5° C. to 2° C. The fermentation is continued, with subsequent temperature reductions of from 0.5° C. to 2° C. each time that the concentration of acetic acid in the fermentation broth increases by 0.05 to 2 percent weight by volume over the highest concentration found in the course of the fermentation at the preceeding temperature stage, until the desired concentration of acetic acid is obtained. However, at no time is the temperature of the fermenting broth allowed to fall below 20° C.

2 Claims, No Drawings

PROCESS FOR THE PRODUCTION OF VINEGAR WITH HIGH ACETIC ACID CONCENTRATION

BACKGROUND OF THE INVENTION

1. Field of the Invention

This invention relates to a process for producing vinegar having a high acetic acid concentration, and more particularly to a process for producing vinegar having an acetic acid concentration higher than 20 percent weight by volume in a submerged fermentation process.

In the specification and claims of this invention, the concentration of acetic acid is expressed, unless otherwise indicated, in percent weight by volume and the concentration of alcohol in percent volume by volume, and the sum of percent weight by volume of acetic acid and percent volume by volume of alcohol is called total concentration.

2. Description of the Prior Art

Hitherto, various attempts have been made for obtaining vinegar having a high acetic acid concentration. For example, in the process described in Patent Laying-open No. Sho 52-15,899 (Tokkyo Kōkai Kōhō), vinegar having a high acetic acid concentration is obtained by a continuous batch process wherein the manner of alcohol feeding is improved and also in the processes described in Patent Laying-open Nos. Sho 52-79,092; Sho 53-41,495 and Sho 53-44,696 (Tokkyo Kōkai Kōhō), productions of vinegar having a high acetic acid concentration are attempted by separating a multiplication tank from an acidification tank.

In acetic acid fermentation the higher the acetic acid concentration becomes, the severer the inhibition of the growth of acetic acid bacteria by acetic acid becomes the acetic acid being the main product in the acetic acid fermentation. As a result vinegar having an acetic acid concentration higher than 20 percent weight by volume has never been economically produced in a submerged fermentation process and hence there remain various matters to be improved in the acetic acid fermentation.

Also, in the case of producing vinegar by a submerged fermentation process, as the fermentation temperature is higher, the production of vinegar having a high acetic acid concentration becomes more difficult. Hromatka et al report in "Enzymologia", Vol. 15, 337-350 (1953) that in the production of vinegar by a submerged fermentation the higher the total concentration of a fermenting broth becomes, the lower the optimum temperature thereof becomes. However, the report is on the production of vinegar having an acetic acid concentration up to 12 percent weight by volume and in the reported process the growth rate of acetic acid bacteria becomes lower due to the low fermentation temperature, which results in greatly reducing the acidification rate and makes the process unpractical from an economical view point.

SUMMARY OF THE INVENTION

The object of this invention is to provide a process for producing vinegar having an acetic acid concentration higher than 20 percent weight by volume with a high efficiency in a submerged fermentation while overcoming the aforesaid difficulties in the conventional processes.

According to the invention there is provided a process for the production of vinegar by a submerged fermentation technique. The process comprises initiating fermentation of an acetic acid producing broth and maintaining the temperature of the fermenting broth at a temperature of from 27° to 32° C. until the concentration of acetic acid produced in the broth reaches from 12 to 15 percent (weight by volume). Then the temperature of the fermenting broth is reduced by from 0.05° to 2° C. This reduction of temperature is repeated each time the concentration of acetic acid increases by from 0.05 to 2.0 percent (weight by volume) over that found in the previous temperature stage, but reduction is never below 20° C. When the desired concentration of acetic acid is obtained (higher than 20 percent weight by volume), the fermentation may be terminated.

DESCRIPTION OF THE PREFERRED EMBODIMENTS

Now, the invention will be explained below in detail.

Various processes have hitherto been employed for producing vinegar by a submerged fermentation process and in such conventional processes, temperatures of 26°-40° C., usually 28°-32° C. are employed as the fermentation temperatures throughout the whole fermentation period. This temperature range is selected as the optimum temperature condition for producing vinegar by a submerged fermentation process and it is also considered to be important for minimizing the change of environment for acetic acid bacteria.

However, the inventors considered that the phase of acetic acid bacteria used in an acetic acid fermentation could be generally classified into a phase of continuing the multiplication with the acidification (hereinafter, referred to as growth phase) and a phase of stopping the multiplication and continuing the acidification only (hereinafter, referred to as acidification phase), and the employment of a same temperature throughout the two phases was the largest cause of making it difficult to obtain a high acetic acid concentration by a conventional process. That is, as the result of various investigations on paying attention to the properties of acetic acid bacteria, the inventors found that the optimum temperature differed between the growth phase and the acidification phase, and based on the finding, the inventors previously invented a process for producing vinegar wherein conventionally known temperatures, 27°-32° C. were employed in the growth phase, but the temperature of the fermenting broth was lowered to 18°-24° C. in the acidification phase (Patent Application Sho 54-14,216).

Thereafter, the inventors continued their investigations. They found that when lowering the temperature of the fermenting broth in the acidification phase, it is important to do so in stages as the acetic acid concentration increases. This is in order to control the inhibition of the growth of acetic acid producing bacteria (caused by increasing acetic acid concentrations in the fermenting broth).

Thus, the results obtained by investigating the acetic acid concentration at initiating the lowering of the temperature of the fermenting broth will be explained by the following experiment.

EXPERIMENT 1

A broth prepared using alcohol, water, finished vinegar, and nutrients for acetic acid bacteria was charged in a submerged fermentation tank, when the temperature in the tank reached 30° C., the broth was innoculated with acetic acid bacteria to initiate the fermentation, and thereafter, the temperature of the broth was controlled to about 30° C. by means of a control thermometer. In this case, the acetic acid concentration was 6.8 percent weight by volume and the alcohol concentration was 3.2 percent volume by volume. Then, when the fermentation proceeded and the acetic acid concentration reached 8.5 percent weight by volume, alcohol having an alcohol concentration of about 50 percent volume by volume was begun to feed to the fermenting broth. When the acetic acid concentration increased, the temperature of the fermenting broth was lowered to 26° C. by changing the setting of the control thermometer for controlling the temperature of the fermenting broth. In this case, the acetic acid concentration at initiating the lowering of the temperature was changed to various values and the mean acidification rates measured 4 hours before and 4 hours after the acetic acid concentration reached each changed acetic acid concentration were investigated. The results are shown in Table 1.

In addition, mean acidification rates A and B in the table were calculated according to the following equations:

$$A = \frac{X-Y}{4} \quad B = \frac{Z-X}{4}$$

wherein:
X: The acetic acid concentration (% weight by volume) when the temperature changed.
Y: The acetic acid concentration (% weight by volume) measured 4 hours before the temperature was changed.
Z: The acetic acid concentration (% weight by volume) measured 4 hours after the temperature was changed.

TABLE 1

| X (% weight by volume) | A (%/hr.) | B (%/hr.) |
|---|---|---|
| 10.1 | 0.16 | 0.10 |
| 11.2 | 0.18 | 0.11 |
| 12.2 | 0.20 | 0.20 |
| 13.1 | 0.20 | 0.19 |
| 14.1 | 0.17 | 0.16 |
| 15.0 | 0.15 | 0.14 |
| 16.1 | 0.13 | 0.09 |

X: The acetic acid concentration when the temperature was changed.
A: The mean acidification rate during 4 hours before the acetic acid concentration reached the value at the case of changing the temperature.
B: The mean acidification rate during 4 hours after the acetic acid concentration reached the value at the case of changing the temperature.

From the results shown in Table 1, it is understood that the initiation of the lowering of the temperature when the acetic acid concentration of fermenting broth is 12–15 percent weight by volume, preferably 12–13 percent weight by volume gives almost no influences on the acidification rate and hence the proper acetic acid concentration at initiating the change of the temperature is 12–15 percent weight by volume, preferably 12–13 percent weight by volume.

Then, the results obtained by investigating the conditions for lowering the temperature of fermenting broth after the acetic acid concentration reached 12–15 percent weight by volume, that is, in an acidification phase will be explained by the following experiment.

EXPERIMENT 2

A fermenting broth prepared using alcohol, water, finished vinegar, and nutrients for acetic acid bacteria so that the acetic acid concentration was 6.8 percent weight by volume and the alcohol concentration was 3.2 percent volume by volume was charged in a submerged fermentation tank as used in Experiment 1 and while controlling the temperature of the fermenting broth to 30°–31° C. using a control thermometer, the fermenting broth was innoculated with acetic acid bacteria to initiate the fermentation. When the fermentation proceeded and the acetic acid concentration reached 8.5 percent weight by volume, the alcohol was begun to feed to the fermenting broth as in Experiment 1. When the acetic acid concentration further reached 12.3 percent weight by volume, the temperature of the fermenting broth was lowered with the increase in the acetic acid concentration by changing the setting temperature of the control thermometer and while adding thereto, if necessary, alcohol, the fermentation was continued until the acidification stopped. The results obtained by investigating various combinations of the increasing rates of the acetic acid concentration, i.e., 0.05; 0.1; 0.3; 0.5; 1; 1.5; 2.5; and 3 (percent weight by volume) and the lowering rates of the temperature with the increase of the acetic acid concentration, 0.5; 1; 1.5; 2; 2.5; and 3 (°C.) are shown in Table 2.

In Table 2, the figures of the upper row show the final acetic acid concentration (% weight by volume) and the figures of the lower row show the mean acidification rate (% by hour) in the acidification phase. The mean acidification rate (% by volume) was calculated by the following equation.

$$\text{Mean acidification rate} = \frac{U - 12.3 \text{ (\% weight by volume)}}{T}$$

U: Final acetic acid concentration (% weight by volume).
T: Time (hour) from changing the temperature till the stop of the acidification.

TABLE 2

| Increase of acetic acid concentration (% weight by volume) | Lowering rate of fermentation temperature | | | | | |
|---|---|---|---|---|---|---|
| | 0.5° C. | 1° C. | 1.5° C. | 2° C. | 2.5° C. | 3° C. |
| 0.05 | 20.2 | 20.1 | 20.3 | 20.2 | 19.5 | 19.0 |
| | 0.11 | 0.11 | 0.10 | 0.10 | 0.07 | 0.03 |
| 0.1 | 20.3 | 20.2 | 20.4 | 20.3 | 20.0 | 19.1 |
| | 0.12 | 0.11 | 0.12 | 0.10 | 0.05 | 0.08 |
| 0.3 | 20.5 | 20.4 | 20.2 | 20.2 | 20.1 | 19.0 |
| | 0.13 | 0.12 | 0.12 | 0.11 | 0.05 | 0.10 |
| 0.5 | 20.5 | 20.4 | 20.3 | 20.6 | 20.1 | 19.0 |
| | 0.11 | 0.12 | 0.11 | 0.10 | 0.08 | 0.12 |
| 1 | 20.4 | 20.6 | 20.8 | 21.0 | 20.3 | 18.8 |
| | 0.12 | 0.14 | 0.13 | 0.12 | 0.06 | 0.11 |
| 1.5 | 20.6 | 20.7 | 21.4 | 21.0 | 20.4 | 18.6 |
| | 0.13 | 0.13 | 0.14 | 0.13 | 0.06 | 0.11 |
| 2 | 20.3 | 20.8 | 21.5 | 20.9 | 20.3 | 18.5 |
| | 0.13 | 0.12 | 0.11 | 0.14 | 0.05 | 0.10 |
| 2.5 | 20.1 | 20.2 | 20.0 | 20.3 | 20.2 | 18.2 |
| | 0.07 | 0.06 | 0.06 | 0.05 | 0.05 | 0.10 |
| 3 | 19.0 | 19.1 | 18.8 | 18.6 | 18.4 | 18.0 |
| | 0.12 | 0.11 | 0.11 | 0.10 | 0.10 | 0.09 |

From the results in Table 2, it is understood to be necessary for maintaining a high mean acidification rate in the acidification phase and fermenting the fermenting broth up to a high acetic acid concentration higher than 20 percent weight by volume to lower the temperature of fermenting broth at a rate of within 2° C. while the acetic acid concentration increases at an increasing rate of 0–2 percent weight by volume (excluding, however, 0 percent weight by volume).

Then, although as the acetic acid concentration becomes higher, it is better to lower the temperature of fermenting broth, it was considered that in order to keep a high acidification rate in a high acetic acid concentration region, there was, as a matter of course, a lower limit about the temperature of fermenting broth, and hence the result obtained by investigating the lowermost temperature of fermenting broth will be explained by the following experiment.

EXPERIMENT 3

A fermenting broth prepared using alcohol, water, finished vinegar, and nutrients for acetic acid bacteria so that the acetic acid concentration was 6.5 percent weight by volume and the alcohol concentration was 3.5 percent volume by volume was charged in the submerged fermentation tank as used in Experiment 1 and while controlling the temperature of the fermenting broth to 30°–31° C. using a control thermometer, the fermenting broth was innoculated with acetic acid bacteria to initiate the fermentation. When the fermentation proceeded and the acetic acid concentration reached 8.5 percent weight by volume, the alcohol was begun to feed to the fermenting broth as in Experiment 1. Furthermore, when the acetic acid concentration reached 12.5 percent weight by volume, the temperature of the fermenting broth was lowered by changing the setting of the control thermometer at a rate not over 2° C. with the increase of the acetic acid concentration at a rate of 1–2 percent weight by volume, and while feeding, if necessary, alcohol to the fermenting broth, the fermentation was continued until the acidification stopped. In this case, while changing the finally setting temperature of the fermenting broth to 22; 21; 20; 19; 18; 17; and 16 (°C.), the optimum lowest temperature was investigated. The results are shown in Table 3.

In Table 3, the mean acidification rate was calculated by the following equation.

$$\text{Mean acidification rate} = \frac{1 \ (\% \ \text{weight by volume})}{T}$$

$T$: Time (hours) required for increasing the acetic acid concentration by final 1% weight by volume.

TABLE 3

| Final temperature (°C.) | Final acetic acid concentration (% weight by volume) | Mean acidification rate for final 1% weight by volume in the increase of acetic acid concentration (% by hour) |
| --- | --- | --- |
| 22 | 20.86 | 0.11 |
| 21 | 20.96 | 0.10 |
| 20 | 20.88 | 0.10 |
| 19 | 20.65 | 0.06 |
| 18 | 20.56 | 0.05 |
| 17 | 19.67 | 0.05 |
| 16 | 19.25 | 0.04 |

From the results in Table 3, it is understood that although the acetic acid concentration reaches about 20 percent weight by volume when the final fermentation temperature of fermenting broth is about 18° C., the mean acidification rate decreases extremely to prolong the period of time required for the fermentation, which is economically disadvantageous, and hence the proper lower limit of the lowest temperature of the fermenting broth is 20° C.

On the other hand, in the growth phase, conventionally known temperatures, that is, 27°–32° C. are suitable for the multiplication of acetic acid bacteria.

Thus, the process of this invention can be performed according to a manner of producing vinegar by a conventional submerged fermentation except the specific operation that in the case of producing vinegar by a submerged fermentation, the temperature of a fermenting broth is maintained at 27°–32° C. until the acetic acid concentration of the fermenting broth reaches 12–15 percent weight by volume after the initiation of fermentation and thereafter, while the acetic acid concentration of the fermenting broth increases at a rate of 0–2 percent weight by volume (excluding, however, 0 percent weight by volume), the temperature of the fermenting broth is lowered at a rate not over 2° C. and in such a manner that the final temperature of the fermenting broth does not lower below 20° C.

In more detail, a broth prepared by using alcohol, water, finished vinegar or acetic acid, and nutrients for acetic acid bacteria (such as, for example, sake cake extract, yeast extract, inorganic salts, saccharides, and organic acids) is used as the broth in this invention.

As the submerged fermentation tank for performing the fermentation in this invention, a tank wherein a relatively small amount of air (for example, 5–30%/min. to the amount of a fermenting broth in the tank) aerated in a fermenting broth in the tank is sufficiently mixed, such as, for example, an aeration, agitation fermentor, an air lift fermentor, a gas extrained fermentor, etc., is used since both alcohol which is the main raw material and acetic acid which is the main product are volatile.

Also, as the fermentation process, a proper process selected from a batch process, an alcohol feeding batch process, and a two stage process by a combination of a continuous batch process and a batch process may be used. Furthermore, the innoculation with acetic acid bacteria as well as aging, filtration, pasteurization, etc., for forming vinegar from the finished vinegar after finishing the fermentation can be performed according to conventional manners.

Thus, according to the process of this invention, a finished vinegar having an acetic acid concentration higher than 20 percent weight by volume can be obtained with a high efficiency by a submerged fermentation and vinegar having an acetic acid concentration higher than 20 percent weight by volume can be produced by aging, filtering, and pasteurizing the finished vinegar according to conventional manners. Moreover, by lowering the temperature of the fermenting broth with the increase of acetic acid concentration in the acidification phase according to this invention, the extreme reduction in acetic acid concentration can be prevented as well as the loss due to evaporation of alcohol which is the main raw material for producing vinegar and acetic acid which is the main product can be suppressed as low as possible. Thus, the process of this invention is very useful for the production of vinegar by a submerged fermentation.

The following example is intended to illustrate this invention but not to limit in any way.

EXAMPLE

In a 25,000 liter submerged fermentation tank equipped with an agitator for finely dispersing air introduced from the outside in the broth in the tank, a cooling coil, and a deformer and connected to a rotor meter for air was charged 15,000 liters of a broth having an acetic acid concentration of 6.8% weight by volume and an alcohol concentration of 3.7% volume by volume prepared by mixing denatured alcohol, water, unfiltered white vinegar, and nutrients such as saccharides, inorganic salts, yeast extract, etc., and the aeration was started at an amount of aerating air of about 2,000 liters/min. When the temperature of the fermenting broth reached 30° C., the temperature of the fermenting broth was maintained at 29.8°-30.2° C. by the aid of the control thermometer.

On the other hand, in a 15,000 liter submerged fermentation tank having the same structure as the aforesaid tank was charged a broth prepared using the same raw materials as above and the submerged fermentation was started by a so-called continuous batch process. When the acetic acid concentration reached about 7% weight by volume after the re-charge of the mash to this fermentation tank was completed, 2,000 liters of the fermenting broth in this fermentation tank was quickly innoculated into the broth in the above-described 25,000 liter submerged fermentation tank by means of a self-priming pump without interrupting the aeration. In this case, the alcohol concentration of the fermenting broth used for the innoculation was about 3.5% volume by volume. Also, the acetic acid concentration of the innoculated fermenting broth in the submerged fermentation tank was 6.82% weight by volume and the alcohol concentration thereof was 3.68% volume by volume.

After 5 hours since the innoculation, it was confirmed that the acetic acid concentration increased to 0.54% weight by volume and the fermentation started with a short lag phase. When the acetic acid concentration of the fermenting broth reached 8.5% weight by volume and the alcohol concentration reached 1.8% volume by volume after 7 hours, denatured alcohol having an alcohol concentration of about 50% volume by volume was begun to feed.

When the acetic acid concentration of the fermenting broth reached 12.5% weight by volume after 18 hours since the initiation of feeding of alcohol, the setting of the control thermometer was changed to 28° C. Then, after 11 hours, 24 hours, and 40 hours since then, the setting of the control thermometer was changed to 26° C., 24° C., and 22° C. respectively and in this case, the acetic acid concentration of the fermenting broth was 14.5, 16.5 and 18.5% weight by volume respectively.

After 46 hours, the acetic acid concentration reached 19.5% weight by volume and the alcohol concentration reached 1.5% volume by volume, and hence the feeding of alcohol was stopped. In this case, the total volume of the fermenting broth was about 23,200 liters.

The fermentation was further continued and when the acetic acid concentration of the fermenting broth reached 20.6% weight by volume and the alcohol concentration reached 0.3% volume by volume after 54 hours since the setting of the control thermometer was begun to change, the control thermometer for the apparatus with aerator and agitator was stopped and about 23,200 liters of the total finished vinegar was recovered. The temperature of the fermenting broth directly before stopping the control thermometer was 22.1° C.

By further performing the aforesaid fermentation 10 times by the batch process as described above, a finished vinegar having a mean acetic acid concentration of 20.8% weight by volume was obtained.

By aging, filtering, and pasteurizing the finished vinegar by conventional manners, vinegar having a high acetic acid concentration was obtained.

What is claimed is:

1. A process for the production of vinegar by a submerged fermentation, which comprises; initiating fermentation of an acetic acid producing broth; maintaining the temperature of the fermenting broth at between 27°-32° C. until the acetic acid concentration of the fermenting broth reaches 12-15 percent weight by volume; lowering the temperature by 0.5° C. to 2° C.; and thereafter lowering the temperature of the fermenting broth by increments of from 0.5° C. to 2° C. each time the concentration of acetic acid in the fermenting broth increases by from between 0.05 and 2.0 percent weight by volume above the concentration of acetic acid in the broth at the time of the most previous lowering of temperature; until a vinegar having an acetic acid concentration higher than 20 percent weight by volume is obtained; provided that in lowering the temperature of the fermenting broth, the temperature of the broth is not reduced below 20° C.

2. The process for the production of vinegar as claimed in claim 1 wherein the finished vinegar obtained is further aged, filtered, and pasteurized to provide vinegar.

* * * * *